United States Patent [19]

Mannen et al.

[11] Patent Number: 5,088,539
[45] Date of Patent: Feb. 18, 1992

[54] TIRE CHANGING APPARATUS

[75] Inventors: Bryce Mannen; Gregory M. Calico, both of Conway, Ark.; Tumkur R. Vijay, Newark, Del.

[73] Assignee: FMC Corporation, Chicago, Ill.

[21] Appl. No.: 580,707

[22] Filed: Sep. 11, 1990

[51] Int. Cl.$^5$ .................................... B60C 25/132
[52] U.S. Cl. .................... 157/1.17; 157/1.24; 157/20; 157/21
[58] Field of Search ............... 157/1.17, 1.24, 20, 157/21

[56] References Cited

U.S. PATENT DOCUMENTS

| | | | |
|---|---|---|---|
| 3,847,198 | 11/1974 | Brosene | 157/1.24 |
| 4,047,553 | 9/1977 | Kotica | 157/1.24 |
| 4,133,363 | 1/1979 | Gardner | 157/21 X |
| 4,433,578 | 2/1984 | Hill | 157/21 X |
| 4,538,660 | 9/1985 | Franco | 157/20 |

Primary Examiner—James G. Smith
Attorney, Agent, or Firm—J. Preston Oxenham; Richard B. Megley

[57] ABSTRACT

A tire changer having a vertical wheel hold down shaft rotatably mounted in a base cabinet and extending upward to a wheel mounting end portion above the cabinet. A collar attached to the hold down shaft beneath its mounting end portion and having a frusto-conical section extending upward to a backing flange centered about the hold down shaft. A locking pin which fits into a wheel lug hole extends upward from the flange. An upwardly extending biased centering cone slidably fitted around the hold down shaft. A bead breaker arm pivotally attached to an outside wall of the cabinet to pivot in a horizontal plane. A pneumatic cylinder is provided which is linked to both the hold down shaft and the bead breaker arm to actuate both, thus providing one pneumatic means for two different functions.

5 Claims, 6 Drawing Sheets

FIG_1

FIG_3

FIG_5

FIG_6

TIRE CHANGING APPARATUS

TECHNICAL FIELD

The present invention relates to tire changers. More particularly, the present invention relates to vertical shaft tire changers in which a wheel assembly is mounted horizontally and rotated about a vertical axis while the wheel assembly is engaged with a stationary tool to remove or install a tire on the rim of the wheel assembly.

INTRODUCTION

"European Style" tire changers, in which a tire assembly is held on a horizontal turntable and rotated while a fixed tire tool mounted on a swing arm is positioned to engage the wheel assembly to mount or remove a tire on the rim are well known in the art. In these changers, a horizontal, circular turntable is mounted upon a cabinet base. The turntable is equipped with a chuck with gripping members which move outward from the center of the table or inward towards the center of the table to clamp the rim of a wheel assembly on the turntable. A swing arm is provided with a holder to hold tire removal and tire mounting tools in engagement with the rim to remove tires from, or mount tires upon the rim as the turntable and rim are rotated by a motor in the base cabinet.

A number of difficulties may be experienced in operating these machines. Often it is difficult to properly place the tire assembly on the turntable so that it may be engaged by the turntable chuck because the top of the base cabinet, including the turntable and gripping members, is hidden behind the wheel assembly as it is held over the turntable. Once the wheel assembly is properly positioned, difficulty maybe experienced while attempting to engage the assembly with the chuck, particularly in the ease of a wheel assembly which is equipped with a wide tire, or which has a slopping inside surface on the wheel rim. The motors and drive assemblies of these tire changers are generally heavy and mechanically complex.

Bead breakers are generally provided on these machines for collapsing the tire carcass of a wheel assembly to allow a tire removal tool to be inserted between the tire and the rim prior to rotation of the assembly to remove the tire. In the prior art, such breakers have been arranged for use while the wheel assembly is mounted horizontally in the turntable chuck, and difficulty may be experienced adjusting the breaker to an appropriate position, which is dependent upon the wheel radius, to collapse the tire carcass. Usually these bead breakers are operated by a dedicated pneumatic cylinder which adds weight, volume and mechanical complexity to the machines of the prior art.

The "European style" machines of the prior art do not positively restrain the wheel assembly. In the event a tire of a wheel assembly is over inflated and exploded while the wheel assembly is mounted on the turntable chuck of those machines, only the friction of the gripping members of the chuck on the rim is available to resist launching of the assembly and, frequently, this is insufficient to restrain the assembly in the case of such failures.

DISCLOSURE OF THE INVENTION

It is an object of the present invention to provide a vertical shaft tire changer which is light, compact and mechanically simple.

It is also an object of the present invention to provide positive restraint of the wheel assembly when the assembly is mounted on the tire changer apparatus.

It is a further object of the present invention to provide a bead breaker on a vertical shaft tire changer which minimizes the need for mechanical adjustment to accommodate wheel assemblies of differing diameters.

It is yet another object of the present invention to provide a tire changer which simplifies positioning of the tire assembly on the changer when the top of the machine base cabinet is obscured from view by the tire assembly during mounting.

It is also an object of the present invention to provide a tire changer which may be completely pneumatically powered.

In accordance with the above objectives a tire changer comprising a preferred embodiment of the present invention has a vertical wheel hold-down shaft rotatably mounted in a base cabinet and extending upward to a wheel mounting end portion above the cabinet. An annular backing collar is attached to the hold-down shaft beneath its mounting end portion and has a frusto-conical section extending and opening upward to a backing flange centered about the hold-down shaft. A locking pin, sized to fit into a lug hole of a wheel, extends upwardly from the backing flange. An upwardly biased centering cone, slidably fitted around the hold-down shaft, extends above the backing collar flange. The mounting end portion of the hold-down shaft above the backing collar is threaded to cooperate with threads within a central bore of a hold-down cone, to allow the hold-down cone to be drawn down against a wheel assembly to clamp it against the backing cone flange.

When removing a tire from a wheel assembly, the center hub opening of the wheel is placed over the hold-down shaft and the wheel assembly is lowered until the centering cone enters the central hub opening and the wheel rest upon the backing collar flange with the rotation pin passing through a lug hole. The assembly is centered during lowering by the centering cone entering the center hub opening. The hold-down cone is then threaded on the mounting end of the hold-down shaft with its frusto-conical surface tapering downward. The hold-down cone is then screwed down to displace the centering cone and hold the assembly firmly against the backing flange.

A pneumatic cylinder with end caps is slidably mounted on guide rods within the base cabinet. Each guide rod is arranged with its longitudinal axis perpendicular to an axis of the hold-down shaft. A piston within the pneumatic cylinder divides the cylinder into two piston chambers. A piston support rod, connected to the piston, passes through one of the end caps and is fixed to the tire changer base cabinet.

Air ports are provided in the end caps of the pneumatic cylinder through which high pressure air can be introduced into the piston chambers and vented from the chambers to cause the cylinder to slide longitudinally, back and forth, on the guide rods.

The rack of a rack and pinion gear assembly is mounted between the end caps of the pneumatic cylinder and has teeth which cooperatively engage the teeth of a pinion gear mounted upon a base end portion of the hold-down shaft. Thus, the hold-down shaft may be caused to rotate by introducing high pressure air into one of the piston chambers and venting the opposing chamber to cause the cylinder to slide longitudinally along the guide rods A bead breaker arm is pivotally attached to an outside wall of the base cabinet of the tire changer at a pivot end to pivot in a horizontal plane. A bead breaker blade is attached to an end of the arm opposite the attachment point. A bead breaker draw bar passes through the cabinet wall to connect a central portion of the bead breaker arm to the pneumatic cylinder so that, by introducing high pressure air into one of the piston chambers and venting the opposing chamber, the cylinder may be caused to slide along the guide rods and draw the bead breaker blade toward an opposing bead breaker pad mounted upon the outside wall of the tire changer base cabinet to collapse a tire carcass introduced therebetween.

These and other aspects and advantages of the present invention will become more apparent upon perusal of the detailed description of the invention together with the drawings in which:

DETAILED DESCRIPTION

Figure 1:
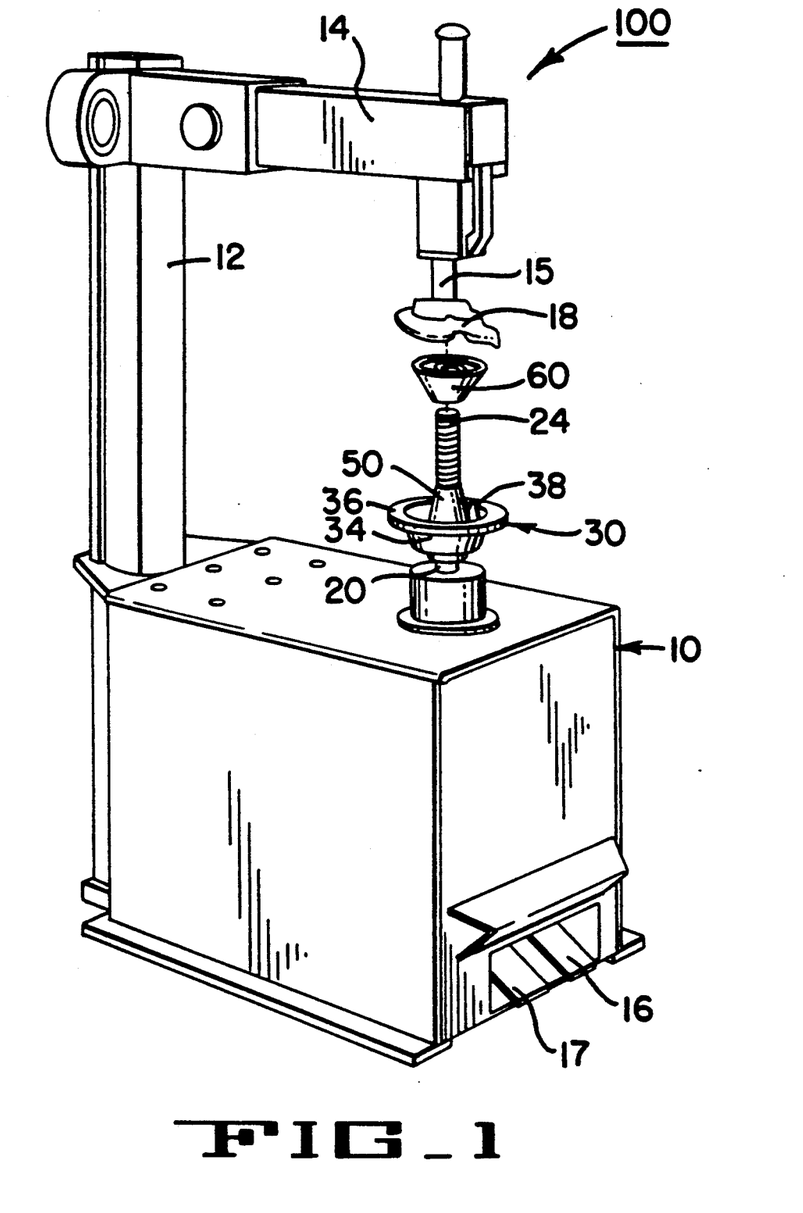
FIG. 1 is an isometric, pictorial view of a tire changer apparatus comprising a preferred embodiment of the present invention.
Figure 3:
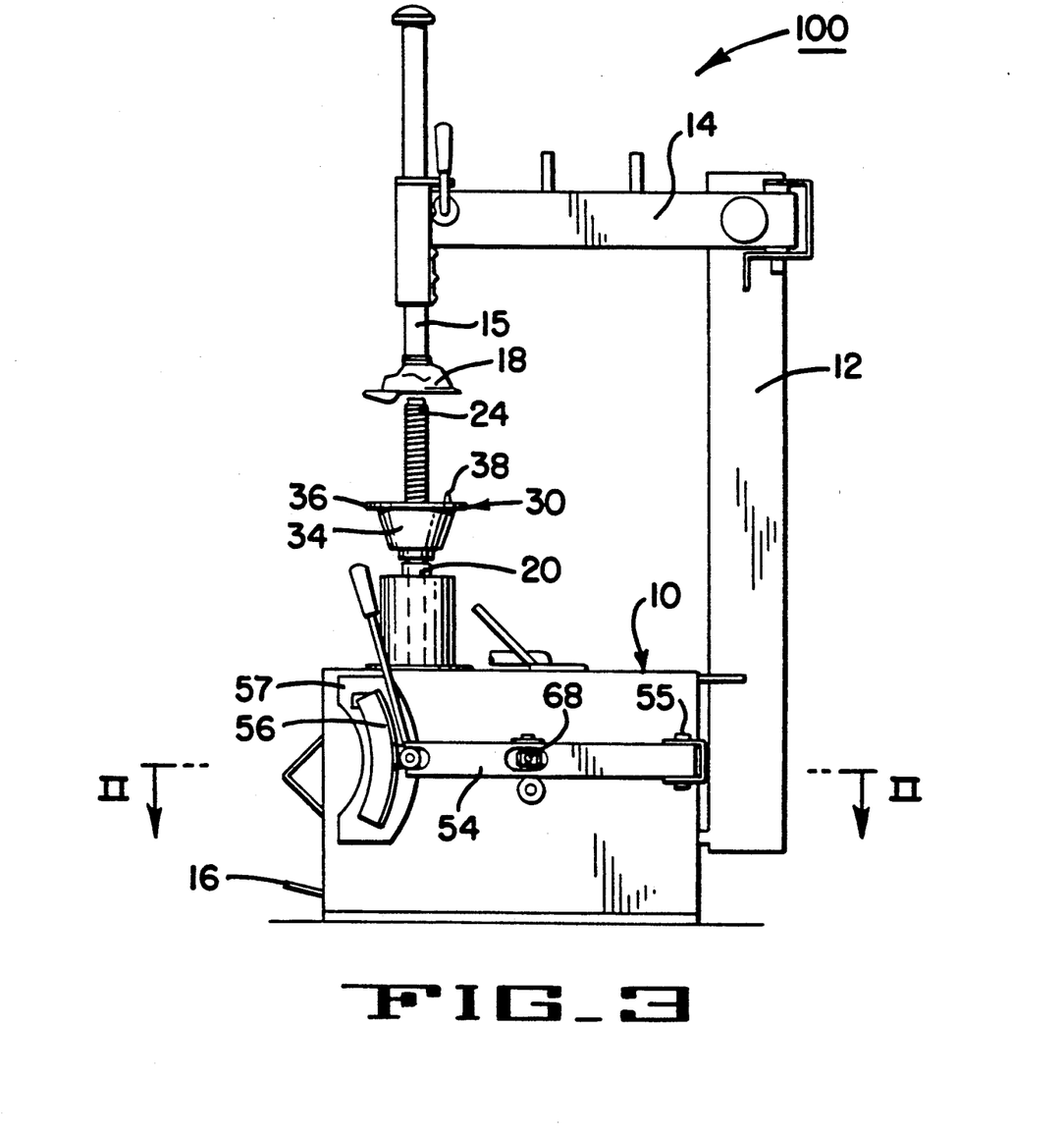
FIG. 3 is a side elevation view of a tire changer apparatus comprising a preferred embodiment of the present invention.
Figure 4:
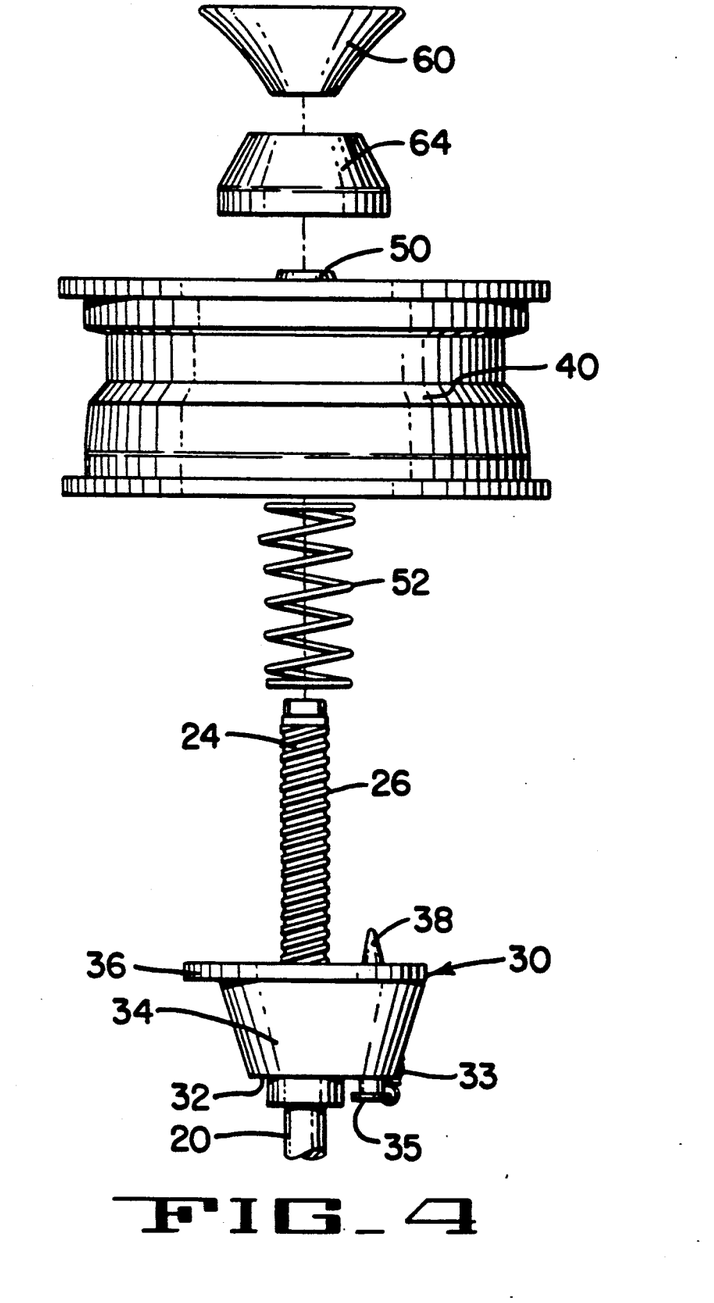
FIG. 4 is an exploded view of the wheel mounting assembly of a tire changer comprising a preferred embodiment of the present invention together with a wheel.

As may be seen in FIGS. 1 and 3, exemplary tire changer apparatus 100, comprising a preferred embodiment of the present invention, includes base cabinet 10, tower assembly 12, and swing arm assembly vertical hold-down shaft 20 is rotatably mounted upon base cabinet 10 and extends upward to wheel mount end portion 24 above the cabinet. As is mole easily seen in the sectional view of FIG. 3, in the preferred exemplary embodiment, hold-down shaft 20 is supported by bearing assembly 22 and vertically located by bearings 21 and 23. An annular backing collar 30 is attached to hold-down shaft 20 at backing collar base 32. Backing collar 30 extends upwardly and outwardly along a frusto-conical extension 34 to backing collar flange 36. Locking pin 38, is sized to slidingly fit within lug holes 42 of a wheel 40. In the preferred embodiment of FIG. 3, locking pin 38 is slidably retained by pin bore 31 in backing collar base 32 and biased upwardly by spring 33 such that locking pin 38 is urged upward until pin flange 33 rests against the bottom of backing collar base 32.

Exemplary tire changing apparatus 100 further includes centering cone 50 which has a central bore sized to slidingly receive mounting end portion 24 of hold-down shaft 20. Centering cone 50 is biased upward, away from backing collar base 32 by coil spring 52. Hold-down cone 60 of tire changing apparatus 100 has a central bore 62 provided with internal threads to cooperate with threads 26 provided on wheel mount end portion 24 of hold-down shaft 20. Protective cup 64, made of a suitably soft and compliant but durable material, may be provided between held-down cone 60 and wheel 40 to minimize the possibility of damage to expensive wheels.

When mounting a wheel assembly on tire changing apparatus 100 comprising the preferred embodiment wheel 40 of the assembly is lowered over wheel mount end portion 24 of hold-down shaft 20 with end portion 24 passing through hub opening 44 of wheel 40. The biasing force of spring 52 will cause centering cone 50 to enter hub opening 44 and center wheel 40 about end portion 24. Protective cup 64 is placed about mounting end 24 before hold-down cone 60 is threaded onto mounting end portion 24. Hold-down cone 60 is then rotated to draw-down cone 60, cup 64 and wheel 40 along end portion 24 until hub portion 46 of wheel 40 is clamped against flange 36. If none of lug holes 42 is aligned with locking pin 38, pin 38 will first be depressed downward against the biasing force of spring 33. A small angular movement of wheel 40 prior to final tightening of hold-down cone 60 will allow the pin to enter a lug hole and lock wheel 40 in fixed angular relation to shaft 20.

Should protective cup 64 not be introduced between hold-down cone 60 and wheel 40, centering cone 50 will continue to be urged downward against the biasing force of spring 52 as hold-down cone 60 is drawn down upon wheel 40 and the small end of the frusto-conical surface of draw-down cone 60 enters hub opening 44. Those familiar with the art will recognize that it is not necessary to utilize centering cone 50 and spring 52 when protection cup 64 is not used because hold-down cone 60 will center wheel 40 as it is drawn down and enters hub opening 44.

Figure 6:
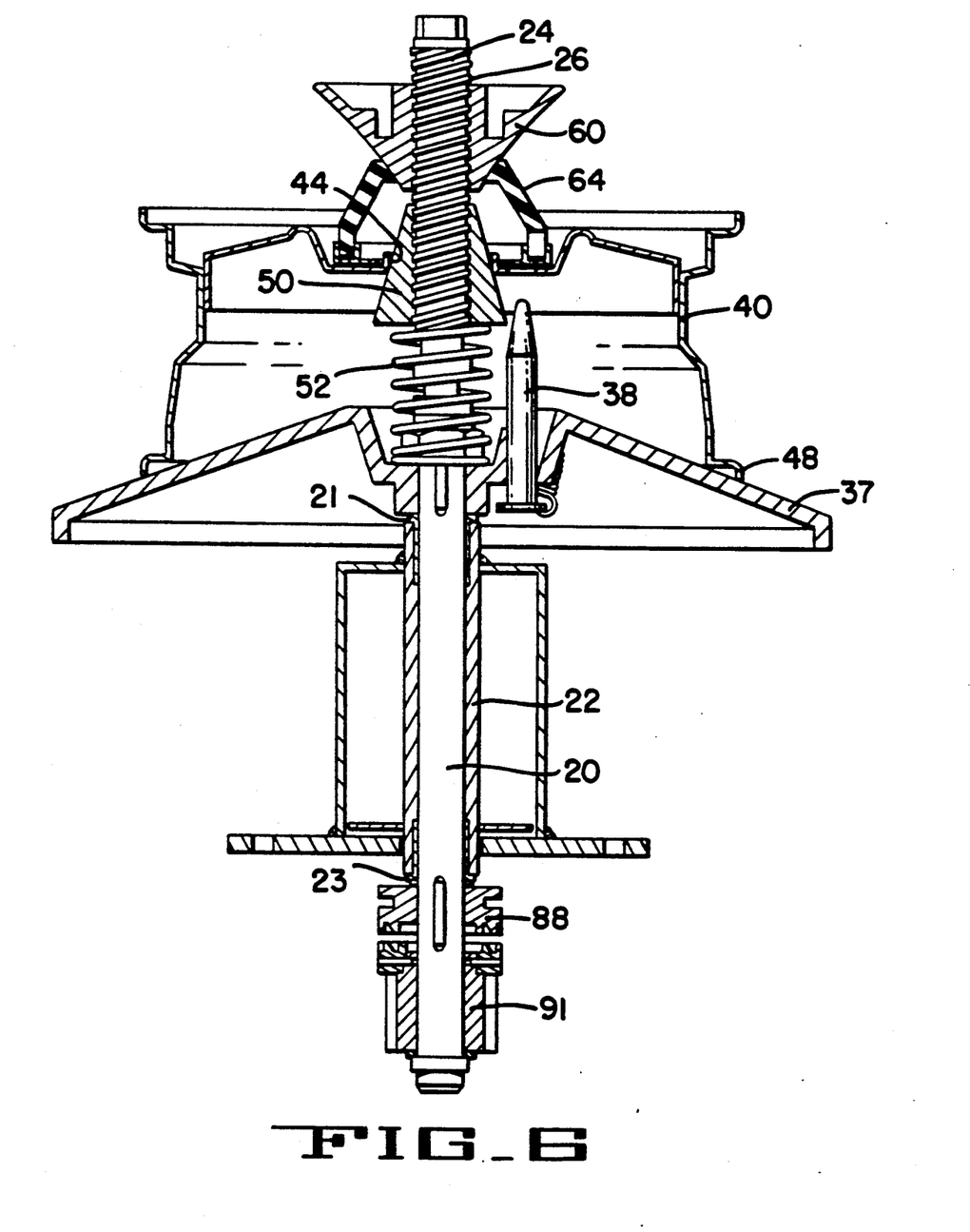
FIG. 6 is a sectional view of the wheel mounting assembly of a tire changer apparatus comprising an alternative preferred embodiment of the present invention.

A tile changer apparatus comprising an alternative embodiment of the present invention is illustrated in FIG. 6. In that embodiment, backing flange 36 is replaced by a conical saddle 37 extending downward and outward about shaft 20. In the embodiment of FIG. 6, when the wheel 40 is drawn down by hold-down cone 60, outer rim 48 of wheel 40 is supported by the conical surface of saddle 37.

Figure 2:
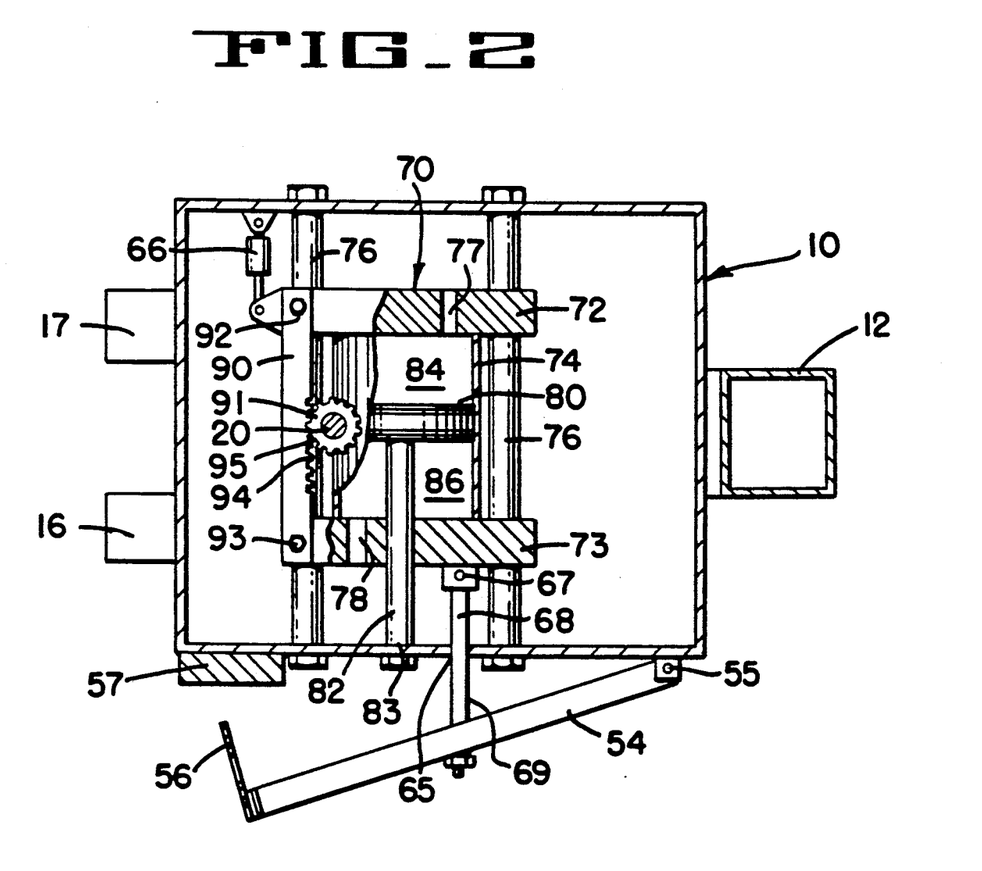
FIG. 2 is a plan view, in partial section, taken at line II—II of FIG. 3 of a tire changer apparatus comprising a preferred embodiment of the present invention.

As may be seen in FIG. 2, which is a plan view of the exemplary preferred embodiment in partial section taken at line II—II of FIG. 3, pneumatic cylinder 70 has end caps 73 and sidewall 74 and is slidably mounted on guide rods 76 by guide bushings installed in bores in portions of end caps 72 and 73 extending beyond cylinder sidewall 74. Guide rods 76 constrain cylinder 70 to move only in the direction of its longitudinal axis which is positioned normal to the longitudinal axis of shaft 20.

Piston 80 divides pneumatic cylinder 70 into two piston chambers, 84 and 86. Piston support rod 82 passes through end cap 73 and is attached to base cabinet 10 at distal end 83. Air ports 77 and 78 in end caps 72 and 73, respectlively, allow high pressure air to be introduced to and bled from piston chambers 84 and 86 by a system of pneumatic valves tubes connected to a source of high pressure air. Such pneumatic power and control systems are well understood by those knowledgeable in the art.

Figure 5:
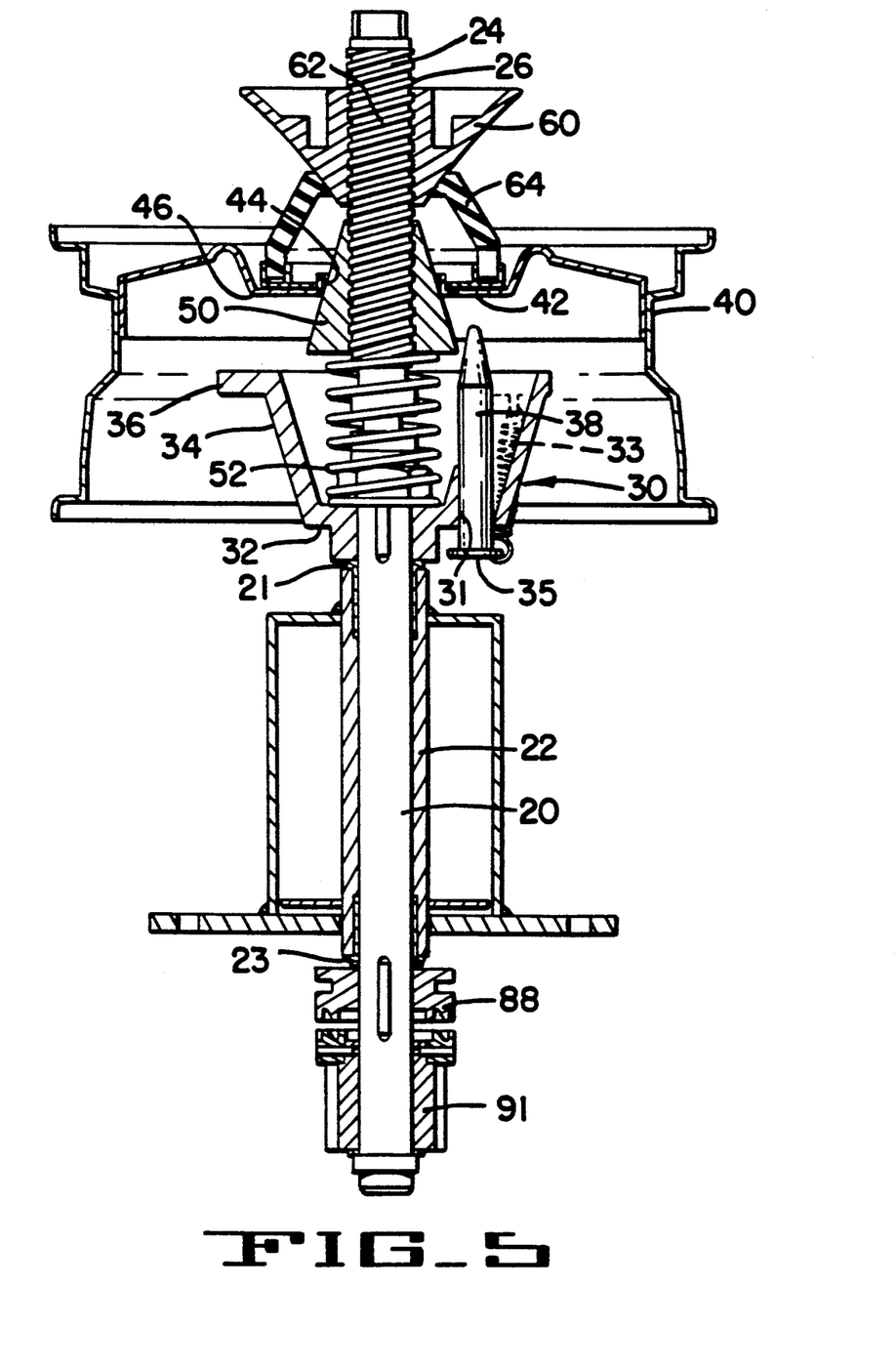
FIG. 5 is a sectional view of the wheel mounting assembly of a tire changer apparatus comprising preferred embodiment of the present invention.

Rack 90 is attached to end caps 72 and 73 by bolts 92 and 93 and is provided with gear teeth 94 which cooperatively engage teeth 95 of pinion gear 91. Pinion gear 91 is mounted on base end portion 28 hold-down shaft 20, as may best be seen in FIG. 5. Thus, any translational movement of cylinder 70 along its axis will result in a proportional rotational movement of shaft 20 about its axis. Pneumatic valves and conduits connected to a source of high pressure air, such as are well understood by those of the art, are utilized to introduce and vent high pressure air to and from chambers 84 and 86 to cause selective rotation of shaft 20 and, thus, of a tire assembly mounted upon wheel mount end portion 24.

As may be seen in FIG. 2 and 3, in the exemplary preferred embodiment, bead breaker arm 54 is pivotally attached to the outside of base cabinet 10 at pivot point 55 to allow pivot arm 54 to pivot in a horizontal plane. Draw bar 68 passes through opening 65 in base cabinet 10 and is pivotally attached to cylinder 70 and breaker arm 54 at 67 and 69, respectively. Breaker blade 56 is attached at the opposite end of breaker arm 54, and breaker block 57 is mounted on the side of base cabinet 10. Thus, by venting piston chamber 84 and introducing high pressure air into piston chamber 86, breaker blade 56 may be drawn toward breaker lock 57 to collapse a tire carcass introduced there between. Positioning of the breaker blade 56 and block 57 on the side of base 10 allows time assemblies of a large diversity of diameters to be rolled into position upon a supporting floor surface between breaker blade 56 and breaker block 57 and the tire carcasses of the assemblies to be collapsed without need for mechanical adjustment of the position of breaker blade 56 or breaker block 57 relative to base cabinet 10. Further, use of a single pneumatic cylinder to power both the breaker and hold-down shaft provides a machine having less weight and complex structure and which can be produced at lower cost than changers using a dedicated cylinder to operate the breaker.

During the change of a tire on a wheel assembly, when using tire changing apparatus 100, the wheel assembly is first rolled into position between bead breaker blade 56 and breaker pad 57. In response to depression of foot pedal 16, piston chamber 84 is first vented while high pressure air is introduced into piston chamber 86 by a pneumatic valve power and control system. Once the tire is collapsed, piston chamber 86 is vented and piston chamber 84 pressurized to swing breaker arm 54 outwardly away from cabinet 10 and allow the wheel assembly to be removed from between breaker blade 56 and breaker pad 57. The wheel assembly is then mounted upon mounting end 24 of shaft 20 of tire changer 100 as earlier described.

Once the wheel assembly is mounted, tire tool 18 is positioned by adjustment of swing arm assembly 14 and tool holder 15 to properly engage the rim and tire of the wheel assembly. Foot pedal 16 is then depressed in response to which a pneumatic power and control system causes piston chamber 86 to be pressurized while chamber 84 is vented to rotate the wheel assembly in the desired direction to allow tool 18 to remove the tire.

After rack 90 has engaged pinion 91 through an entire stroke, corresponding to approximately one revelation of the wheel assembly, the pneumatic power and control system vents chamber 86 and pressurizes chamber 84 to return cylinder 70 to a parked position. In the exemplary preferred embodiment, clutch plate 88 is disengaged from pinion 91 during the return stroke so that the wheel assembly is rotated only in one direction, during the first piston stroke. A rachet and dog mechanism might also be used with pinion 91 and shaft 20, to achieve this same result. Damping cylinder 66, which may be a conventional automobile shock absorber, is attached to rack 90 and base 10 to assure smooth and paced operation of both bead breaker blade 56 and hold-down shaft 20.

While exemplary tire changing apparatus comprising a preferred embodiment of the present invention has been shown, it will be understood, of course, that the invention ies not limited to that embodiment. Modifications may be made by those skilled in the art, particularly in view of the foregoing teachings. For example, to conserve weight and minimize parts rack 90 may be formed intergally with cylinder wall 74. It is, therefore, contemplated by the appended claims to cover any such modification which incorporates the inventive features of the present invention or which encompass the spirit and scope of the invention.

I claim:

1. A tire changing apparatus comprising:
   a base;
   a wheel hold-down shaft rotatably attached to said base at a shaft base end portion and extending upward along a generally vertical axis to a wheel mount end portion;
   wheel mount means for mounting a wheel in fixed relation to said wheel mount end portion such that a rotational axis of said wheel is coincident with said shaft axis and said wheel rotates in fixed angular relation to said shaft;
   a piston;
   piston support means for supporting said piston in fixed relation to said base;
   a piston cylinder including a side wall and an end wall said side wall surrounding a longitudinal cylinder axis lying generally normal to said shaft axis, said cylinder adapted to slidingly and sealingly engage said piston such that said cylinder may move along said longitudinal cylinder axis and said piston, said side wall and said end wall define a piston chamber of variable volume;
   a fluid port through which fluid may flow into and out of said piston chamber;
   a pinion gear;
   pinion gear attachment means for attaching said pinion gear to said hold-down shaft such that when said pinion gear is rotated in a first direction, said shaft is caused to rotate in a first direction, but when said pinion gear is rotated in a second direction, said shaft is not caused to rotate; and,
   a rack attached to said cylinder with a longitudinal rack axis parallel to said cylinder axis and said rack cooperatively engaged with said pinion gear.

2. A tire changing apparatus as in claim 1, in which said pinion attachment means includes a clutch.

3. A tire changing apparatus as in claim 1, in which said pinion and said shaft have a common axis and said pinion attachment means includes a racket such that said shaft will be caused to rotate in a first common direction with said pinion, and a dog, to prevent rotation of said shaft in an opposite direction.

4. A tire changing apparatus comprising:
   a base;

a wheel hold-down shaft rotatably attached to said base at a shaft base end portion and extending upward along a generally vertical axis to a wheel mount end portion;

wheel mount means for mounting a wheel in fixed relation to said wheel mount end portion such that a rotational axis of said wheel is coincident with said shaft axis and said wheel rotates in fixed angular relation to said shaft;

a piston;

piston support means for supporting said piston in fixed relation to said base;

a piston cylinder including a side wall and an end wall said side wall surrounding a longitudinal cylinder axis lying generally normal to said shaft axis, said cylinder adapted to slidingly and sealingly engage said piston such that said cylinder may move along said longitudinal cylinder axis and said piston, said side wall and said end wall define a piston chamber of variable volume;

a fluid port through which fluid may flow into and out of said piston chamber;

cylinder-shaft linking means for linking movement of said cylinder and said shaft such that translational movement of said cylinder along said cylinder axis will cause proportional rotational movement of said shaft about said shaft axis;

a bead breaker pad attached to said base;

a bead breaker blade; and, bead breaker linking means for linking said cylinder to said bead breaker blade such that, when high pressure fluid is introduced into said piston chamber, said blade is caused to move toward said pad.

5. A tire changing apparatus as in claim 4, in which said bead breaker linking means includes:

a bead breaker arm with a hinge end portion and a blade end portion, said hinge end portions pivotally attached to said base and said blade end portion rigidly attached to said blade; and, a draw bar with a first end attached to said cylinder and a second end attached to said bead breaker arm at a point between said hinged end and said blade end.

* * * * *